(12) United States Patent
Winter

(10) Patent No.: US 6,726,162 B1
(45) Date of Patent: Apr. 27, 2004

(54) BOW HOLDER

(76) Inventor: Arnold Winter, 1506 Lowey Heckman Rd., White Oak, PA (US) 15131

( * ) Notice: Subject to any disclaimer, the term of this patent is extended or adjusted under 35 U.S.C. 154(b) by 0 days.

(21) Appl. No.: 10/379,133

(22) Filed: Mar. 4, 2003

(51) Int. Cl.[7] .............................................. A47B 96/06
(52) U.S. Cl. ................................................... 248/218.4
(58) Field of Search ........................... 248/217.4, 216.1, 248/218.4, 339, 298.1; 182/92, 187

(56) References Cited

U.S. PATENT DOCUMENTS

| | | | | |
|---|---|---|---|---|
| 5,310,150 A | | 5/1994 | Fecko | |
| 5,626,322 A | * | 5/1997 | Braun | ...................... 248/282.1 |
| 5,685,103 A | * | 11/1997 | Wiggins | ........................ 42/94 |
| 5,769,372 A | * | 6/1998 | Klosterman | .............. 248/219.4 |
| 5,806,508 A | * | 9/1998 | Stempien et al. | ............. 124/86 |
| 5,857,651 A | * | 1/1999 | Kunevicius | ............... 248/230.8 |
| 5,967,475 A | * | 10/1999 | Johnson | .................... 248/217.4 |
| 6,059,240 A | | 5/2000 | Gorsuch | |
| 6,478,272 B1 | * | 11/2002 | McKinsey et al. | ........ 248/216.1 |
| 6,561,477 B1 | * | 5/2003 | Prive | ........................... 248/339 |
| 2003/0038218 A1 | * | 2/2003 | Eppard et al. | ........... 248/219.4 |

* cited by examiner

Primary Examiner—Ramon O. Ramirez
Assistant Examiner—Kofi Schulterbrandt
(74) Attorney, Agent, or Firm—James Ray & Associates

(57) ABSTRACT

An apparatus for holding a bow in a position to be used with minimal movement required by the user. The apparatus comprises an elongated rod being formed of a predetermined material and consisting of at least one section. A connection member is engageable with a first end of the elongated rod for securing the elongated rod to a tree. The apparatus includes a hook like member and a means disposed at a second end of said elongated rod for enabling said hook like member to be rotatably engaged therein with a second end of said elongated rod.

19 Claims, 3 Drawing Sheets

BOW HOLDER

FIELD OF THE INVENTION

The present invention relates in general to a bow holder apparatus, and, more specifically, the present invention relates to a bow holder for use in conjunction with a tree step and with a tree stand.

BACKGROUND OF THE INVENTION

Hunting with a bow and arrow has significantly increased in popularity in recent years. Bow hunters frequently use a blind, such as an elevated tree stand, in which the hunter can sit on a stand mounted on a tree and, thus, is provided with an unobstructed field of view. This also removes the hunter from the line of sight of the game animals. The hunter, however, may sit in the tree stand for considerable periods of time while waiting for game to appear. Many hunters prefer to have a holder for their bow so as to not have to hold the bow when not in use. Because it is important for the bow to be located in a handy position so that the hunter can quickly bring the bow to a firing position when a game animal is sighted, the bow holder must, therefore, be situated so that bow is readily available.

Various bow holders have been designed for tree platforms in which there is generally a foot platform and a seat for the hunter. Many of these bow holders have the holder attached to the platform. However, these holders can be subject to an inadvertent release of the bow from the holder if bumped by the hunter. Other bow holders are makeshift versions in which nails or hooks are mounted to the trunk or branches of the tree to temporarily hold the bow. However, the desirable tree in which the stand is to be mounted may not have branches available where the hunter would like them to be so he may obtain a good view. Bows that are attached to hooks or nails on a tree also may not lend themselves to easy access to the bow when required by the hunter and any delay may lose the game animal or any noise made by retrieving the bow may startle the animal and again the game animal is lost.

Thus, it is desirable to provide a bow holder which overcomes these drawbacks and provides a bow holder which can position the bow in front of the hunter in an easily retrievable position and in which the bow can be removed easily and quickly.

SUMMARY OF THE INVENTION

The present invention provides an apparatus for holding a bow in a position to be used with minimal movement required by the user. The apparatus comprises an elongated rod being formed of a predetermined material and consisting of at least one section. A means is engageable with a first end of the elongated rod for securing the elongated rod to a tree. The apparatus includes a hook like member and a means disposed at a second end of said elongated rod for enabling said hook like member to be rotatably engaged therein with a second end of said elongated rod.

In an alternate embodiment of the invention there is provided in combination with a tree step having a means for attachment to one of a tree and a post, the improvement comprises an apparatus for holding a bow in a position to be used with minimal movement required by the user. The apparatus includes an elongated rod being formed of a predetermined material and consisting of at least one section and a means engageable with a first end of the elongated rod for securing the elongated rod to one of a tree and a post. The apparatus further includes a hook like member and a means disposed at a second end of the elongated rod for enabling the hook like member to be rotatably engaged therein with a second end of said elongated rod.

OBJECTS OF THE INVENTION

It is, therefore, one of the primary objects of the present invention is to provide a bow holder which is easily mountable on a tree in conjunction with a tree step.

It is also an object of the invention to provide a bow holder which can be used in a tree stand.

Another object of the present invention is to provide a bow holder in which the bow is within easy access of the hunter.

Yet another object of the present invention is to provide a bow holder in which the bow is easily retrieved from the storage position.

Still another object of the present invention is to provide a bow holder which can be easily transported.

An additional object of the present invention is to provide a bow holder which can used equally well for lefthanders or right-handers.

These and various other objects and advantages of this invention will become apparent after a full reading of the following detailed description, particularly, when read in conjunction with the attached drawings as described below and the appended claims.

Figure 1:
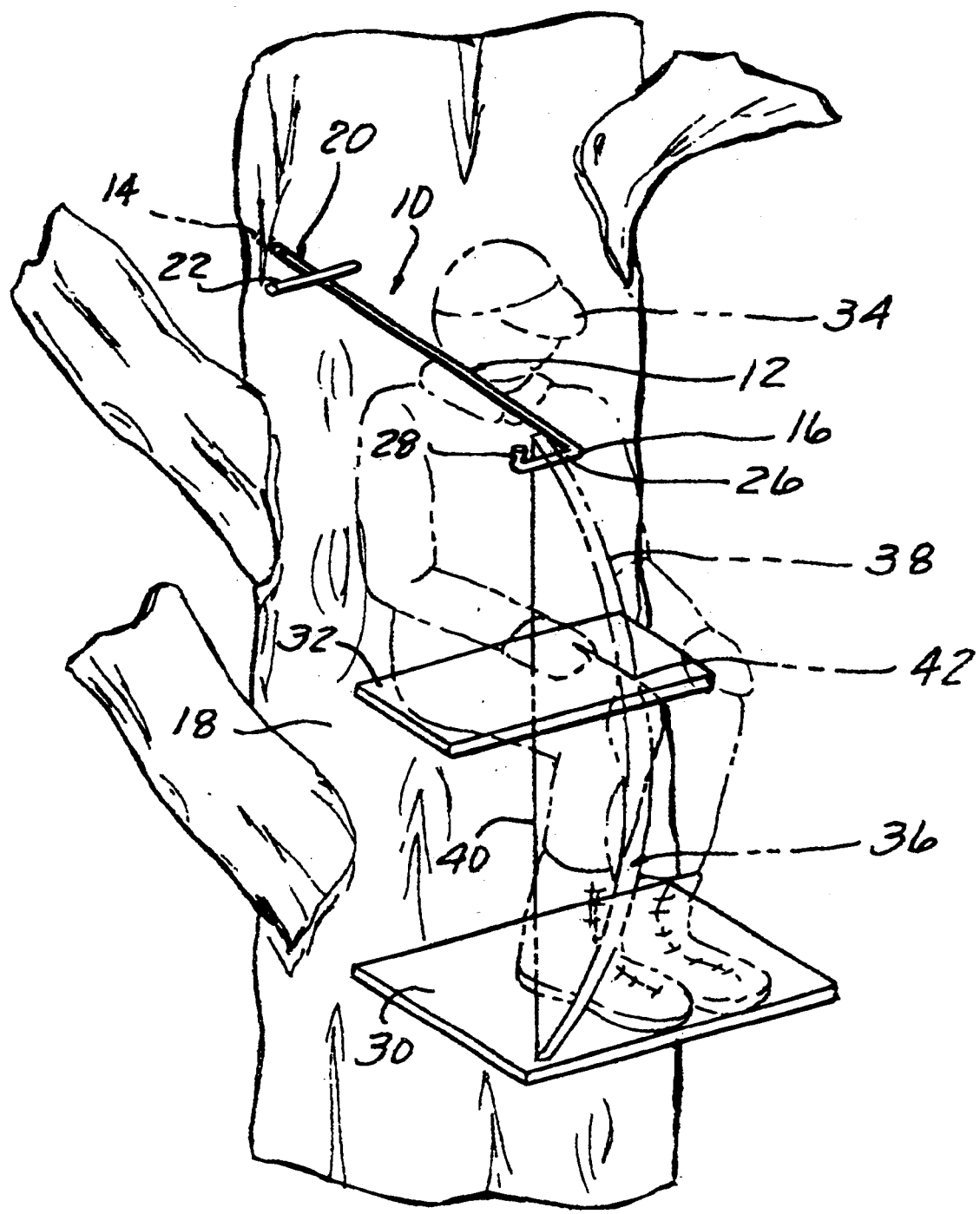
FIG. 1 is a prior art perspective view showing an archery bow holder in conjunction with an elevated tree stand.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Figure 2:
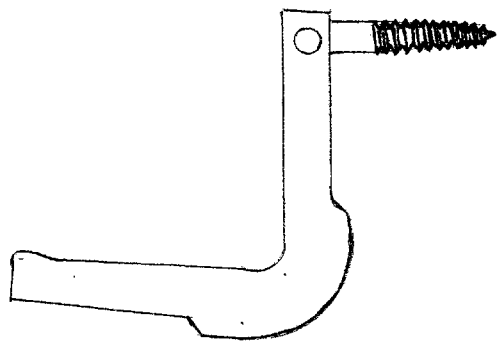
FIG. 2 is side view of a prior art tree step which is screwed into a tree.
Figure 3:
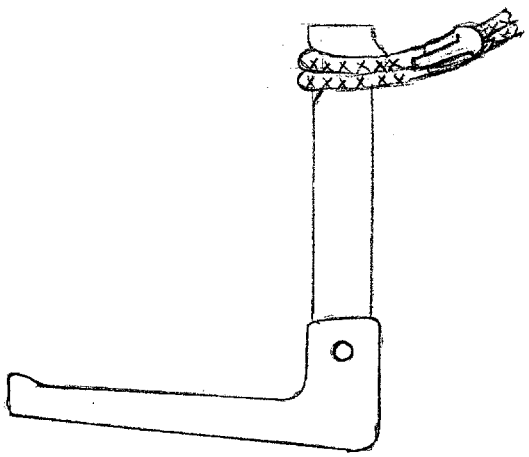
FIG. 3 is side view of another prior art tree step which is secured to a tree by means of rope.
Figure 4:
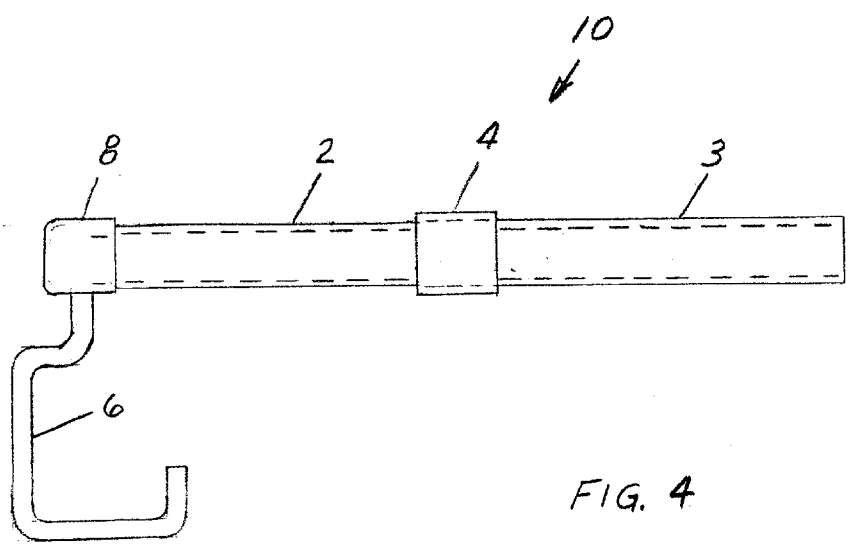
FIG. 4 is a side view of a bow holder according to an embodiment of the invention.

Illustrated in FIG. 1 is a prior art bow holder used in conjunction with a tree stand. FIGS. 2 and 3 are prior art tree steps that are commonly used in the art. One of the tree steps is of the type that screws into a tree trunk while the other shows a tree step that attaches to a tree by means of rope. This type of tree step is used in protected areas where it is not permitted to screw into tree trunks.

Illustrated in FIG. 3 is a bow holder, generally designated 10, according to an embodiment of the invention. The bow holder comprises an elongated rod 2. The elongated rod 2 is formed of a predetermined material and consists of at least one section. The elongated rod 2 is in the form of a tube and in a presently preferred embodiment of the invention such elongated rod includes at least two sections 2 and 3. Further, it is preferred that such two elongated sections 2, 3 are connected by means of a sleeve 4. By being formed as two sections which come apart quite easily the bow holder 10 is much easier to store and much easier to carry from place to place.

Figure 5:
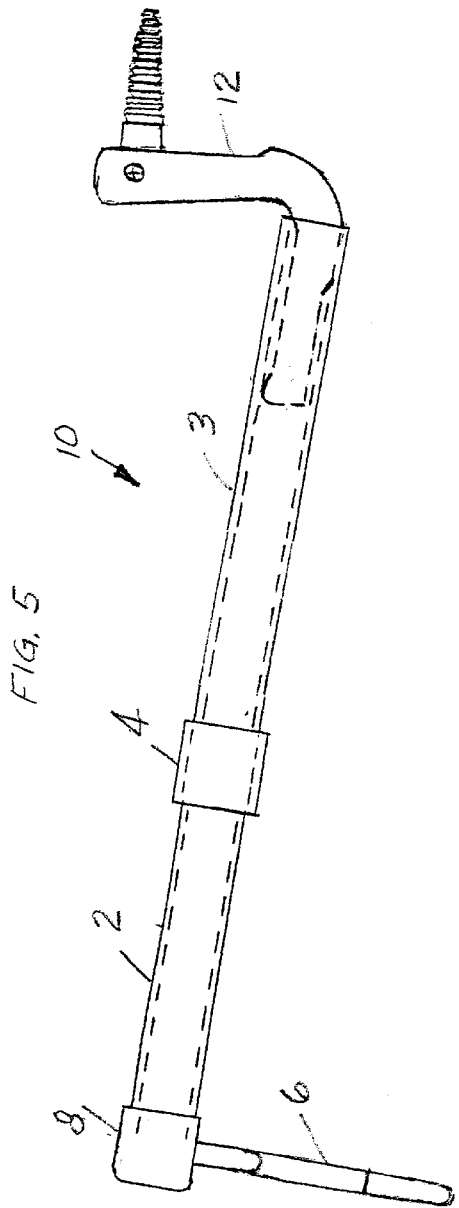
FIG. 5 is a side view of a bow holder according to an embodiment of the invention in conjunction with a tree step.

The bow holder 10 has a means that is engageable with a first end of the elongated rod 2, 3 for securing the elongated rod 2, 3 to a tree. In a presently preferred embodiment of the invention such means for securing the bow holder to a tree is a tree step 12. The elongated tube 2,3 being hollow has an inner diameter such that it will fit snugly onto a tree step 12. The elongated tube 2, 3 connected to a tree step 12 is seen in FIG. 5.

Figures 6A, 6B:
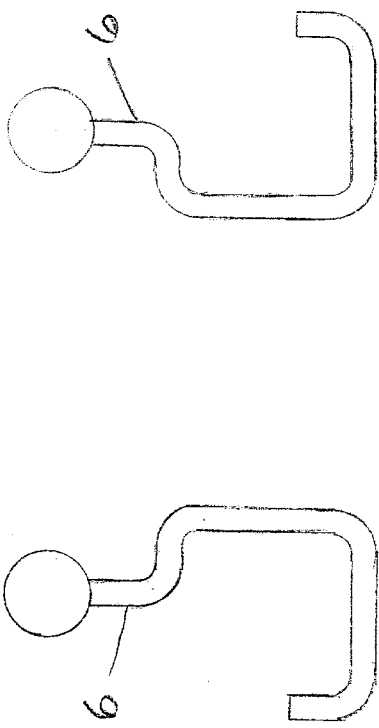
FIGS. 6A and 6B are front views of the hook like member as seen when it is turned to the left side and to the right side.

The bow holder 10 further includes a hook like member 6 and a means disposed at a second end of the elongated rod 2, 3 for enabling the hook like member 6 to be rotatably engaged therein with the second end of said elongated rod. Such hook like member could be secured to elongated rod 2, 3; however, it is presently preferred that the end of such elongated rod 2, 3 have a cap 8 on the end of the rod. It is also preferred that such hook like member 6 be engageable with the cap 8. As stated, the hook like member 6 is rotatably engaged to the elongated rod 2, 3 so that it can be turned to whatever position the user likes. FIGS. 6A and 6B show a frontal view of the hook like member 6 when it is turned to the left side and the right side so the bow (not shown) which hangs from the hook like member 6 is equally accessible for either a right handed archer or a left handed archer.

The elongated rod 2 and 3 as stated previously is made of a predetermined material. It is presently preferred that this material be selected from a group including polyvinylchloride, polyethylene, polypropylene and metal. It is still further preferred that such material is polyvinylchloride.

It is further preferred that such bow holder 10 be painted in such a way so as to provide a camouflage effect. Painting the bow holder 10 will minimize the possibility of sunlight reflecting off the bow holder and possibly alert the prey.

The hook like member 6 being rotatable can thus be turned so that the bow is easily accessible by a right handed archer or a left handed archer. The bow holder 10 is designed so that the bow is in a position to be used and that minimal movement is required by the user. The bow holder 10 can be used in conjunction with a tree stand as is seen in the prior art FIG. 1 or it can be used with the user standing next to a tree or a post or any other vertical member to which the bow holder 10 is attached.

In an alternate embodiment of the invention such bow holder 10 is used in combination with a tree step 12 with the improvement being the bow holder 10 as described above. The tree step 12 could be selected from one of the wide variety of tree steps available on the market. However, it is presently preferred that such tree step 12 be one of the ones sold under the trade name of EZY Climb Step. These steps have a raised portion at the end of the step with which the elongated rod 2, 3 of the bow holder 10 is secured. Further, these steps 12 have a slight upward angle from the horizontal which is ideal for the bow holder 10.

While both the presently preferred and a number of alternative embodiments of the present invention have been described in detail above it should be understood that various other adaptations and modifications of the present invention can be envisioned by those persons who are skilled in the relevant art without departing from either the spirit of the invention or the scope of the appended claims.

I claim:

1. An apparatus for holding a bow in a position to be used with minimal movement required by the user, said apparatus comprising:
   (a) an elongated rod being formed of a predetermined material and consisting of at least one section;
   (b) a means engageable with a first end of said elongated rod for securing said elongated rod to a tree, said means includes a tree step, said tree step includes one of a single threaded portion and a single rope securing portion for attachment to such tree, said tree step further includes a surface engageable portion connected on a first end to said one of said single threaded portion and said single rope securing portion extending substantially perpendicularly in a downward direction therefrom, a step portion connected on one end to a second end of said surface engageable portion extending substantially perpendicularly thereto in a direction away from such tree, said step portion insertable into said elongated rod;
   (c) a hook member disposed closely adjacent a second end of said elongated rod; and
   (d) a means engageable with said hook member and said second end of said elongated rod for enabling said hook member to be rotatably engaged therewith.

2. The apparatus, according to claim 1, wherein said elongated rod is in the form of a tube.

3. The apparatus, according to claim 1, wherein said elongated rod includes at least two sections.

4. The apparatus, according to claim 3, wherein said apparatus further includes a connecting means disposed intermediate said first end and said second end of said elongated rod for connecting said two sections of said elongated rod.

5. The apparatus, according to claim 4, wherein said connecting means is a sleeve.

6. The apparatus, according to claim 1, wherein said elongated rod is removably engageable with said tree step.

7. The apparatus, according to claim 6, wherein said inner diameter of said elongated rod is such that it will fit snugly onto said tree step.

8. The apparatus, according to claim 1, wherein said predetermined material is selected from a group including polyvinylchloride, polyethylene, polypropylene and metal.

9. The apparatus, according to claim 8, wherein said predetermined material is polyvinylchloride.

10. The apparatus, according to claim 1, wherein said apparatus further includes a cap member disposed at said second end of said elongated rod.

11. The apparatus, according to claim 10, wherein said cap member is engageable with said hook member and said second end of said elongated rod for enabling said hook member to be rotatably engaged therewith.

12. The apparatus, according to claim 1, wherein said apparatus further includes a camouflaging means.

13. The apparatus, according to claim 12, wherein said camouflaging means is paint.

14. In combination with a tree step having a means for attachment to one of a tree, a post and any vertical member, the improvement comprising an apparatus for holding a bow in a position to be used with minimal movement required by the user, said apparatus includes:
   (a) an elongated rod being formed of a predetermined material and consisting of at least one section;
   (b) a means engageable with a first end of said elongated rod for securing said elongated rod to a tree, said means includes said tree step, said tree step includes one of a single threaded portion and a single rope securing portion for attachment to such tree, said tree step further includes a surface engageable portion connected on a first end to said one of said single threaded portion and said single rope securing portion extending substantially perpendicularly in a downward direction therefrom, a step portion connected on one end to a second end of said surface engageable portion extending substantially perpendicularly thereto in a direction away from such tree, said step portion insertable into said elongated rod;

(c) a hook member disposed closely adjacent a second end of said elongated rod; and (d) a means engageable with said hook member and said second end of said elongated rod for enabling said hook member to be rotatably engaged therewith.

15. The combination, according to claim 14, wherein said elongated rod is in the form of a tube.

16. The combination, according to claim 14, wherein said elongated rod includes at least two sections.

17. The combination, according to claim 16, wherein said apparatus further includes a connecting means disposed intermediate said first end and said second end of said elongated rod for connecting said two sections of said elongated rod.

18. The combination, according to claim 17, wherein said connecting means is a sleeve.

19. The combination, according to claim 14, wherein said apparatus further includes a cap member disposed at said second end of said elongated rod, said cap member engageable with said hook member and said second end of said elongated rod for enabling said hook member to be rotatably engaged therewith.

* * * * *